US007523122B2

(12) United States Patent
Vasu

(10) Patent No.: US 7,523,122 B2
(45) Date of Patent: Apr. 21, 2009

(54) AUTOMATIC DISCOVERY OF APPLICATION SETTINGS' STORAGE LOCATIONS

(75) Inventor: Vijayendra G. Vasu, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 256 days.

(21) Appl. No.: 11/534,930

(22) Filed: Sep. 25, 2006

(65) Prior Publication Data

US 2008/0077605 A1 Mar. 27, 2008

(51) Int. Cl.
*G06F 17/30* (2006.01)

(52) U.S. Cl. ........................ 707/101; 707/200; 707/204

(58) Field of Classification Search ................. 707/101, 707/200–204
See application file for complete search history.

(56) References Cited

U.S. PATENT DOCUMENTS

| | | | | |
|---|---|---|---|---|
| 6,161,176 | A | 12/2000 | Hunter et al. | |
| 6,182,212 | B1 | 1/2001 | Atkins et al. | |
| 6,370,646 | B1 | 4/2002 | Goodman et al. | |
| 6,687,897 | B2 * | 2/2004 | Guinart | 717/143 |
| 6,795,835 | B2 | 9/2004 | Ricart et al. | |
| 6,823,460 | B1 | 11/2004 | Hollander et al. | |
| 6,920,555 | B1 * | 7/2005 | Peters et al. | 713/100 |
| 6,959,441 | B2 | 10/2005 | Moore | |
| 7,032,011 | B2 | 4/2006 | Woodard | |
| 7,107,589 | B1 * | 9/2006 | Tal et al. | 717/177 |
| 2003/0074386 | A1 | 4/2003 | Schmidt et al. | |
| 2005/0149582 | A1 * | 7/2005 | Wissmann et al. | 707/201 |
| 2006/0085679 | A1 | 4/2006 | Neary et al. | |
| 2006/0129769 | A1 * | 6/2006 | Chen et al. | 711/162 |
| 2006/0136471 | A1 * | 6/2006 | Ge et al. | 707/102 |
| 2006/0235899 | A1 * | 10/2006 | Tucker | 707/200 |
| 2007/0079140 | A1 * | 4/2007 | Metzger et al. | 713/189 |
| 2007/0294577 | A1 * | 12/2007 | Fiske | 714/13 |
| 2007/0294703 | A1 * | 12/2007 | Talu et al. | 719/310 |

FOREIGN PATENT DOCUMENTS

| | | | |
|---|---|---|---|
| GB | 2420198 | A | 5/2006 |

OTHER PUBLICATIONS

Grolaux et al. "Migratable user interfaces: beyond migratory interfaces", Aug. 22-26, 2004 pp. 422-430.*

Jonathan M. Smith "A survey of process migration mechanisms", vol. 22, Issue 3 (Jul. 1988), pp. 28-40, Publication: 1988.*

Li, Wei et al., Automatic Application-Specific Sandboxing for Win32/X86 Binaries, in Proceedings of Program Analysis for Security and Safety Workshop (Password) co-located with ECOOP 2006, Nantes, France, Jul. 2006, 10 pages, Computer Science Department, Stony Brook University, USA.

(Continued)

*Primary Examiner*—Don Wong
*Assistant Examiner*—Hanh B Thai
(74) *Attorney, Agent, or Firm*—Senniger Powers LLP

(57) ABSTRACT

Transferring user state data for an application program from a first execution environment to a second execution environment. An interceptor component records interactions between the application program and a data repository when the application program is executed in the first execution environment. The locations of the recorded interactions in the data repository correspond to the user state data associated with the application program. A script component generates computer-executable scripts based on the identified locations and a migration component transfers the user state data associated with the application program from any first execution environment in which the application is installed to the second execution environment by executing the scripts in the second execution environment.

20 Claims, 6 Drawing Sheets

OTHER PUBLICATIONS

Chen, Hao et al., “Back to the Future: A Framework for Automatic Malware Removal and System Repair,” http://www.cs.ucdavis.edu/research/tech-reports/2005/CSE-2005-6.pdf, last modified Jun. 9, 2005, 16 pages, University of California, Davis, USA.

Lorch, Jacob R. et al., “Building VTrace, a Tracer for Windows NT and Windows 2000,” http://www.eecs.berdeley.edu/Pubs/TechRpts/2000/CSD-00-1093.pdf, Feb. 2000, 17 pages, Computer Science Division (EECS), University of California, Berkeley, California, USA.

Author Unknown, “Windows User State Migration Tool (USMT) version 2.6.2,” Microsoft Download Center, http://www.microsoft.com/downloads/details.aspx? familyid=0CAA294C-29D9-4449-81D5-4B69B97DF7AE&displaylang=en, 3 pages, Jul. 22, 2006, Microsoft Corporation, USA.

Tulloch, Mitch, “Migrating to Vista Using Windows Easy Transfer,” http://www.windowsnetworking.com/articles_tutorials/Migrating-Vista-using-Windows-Easy-Transfer.html, Jul. 26, 2006, 21 pages, WindowsNetworking.com, USA.

* cited by examiner

AUTOMATIC DISCOVERY OF APPLICATION SETTINGS' STORAGE LOCATIONS

BACKGROUND

A computer user often needs to change the computer that she works on due to hardware failure, upgrades to newer hardware or software, etc. In particular, in a business setting, management typically deploys upgrades to hardware or software for all employees in response to business needs. During these upgrades, information technology administrators sometimes need to replace the computer workstations on which the users operate. In upgrading hardware, the administrators typically provide the users with standard or default configured workstations, and the users are left to re-configure personal preferences or settings that were found on their previous workstations. These preferences or settings, collectively referred to as user state data, include documents that users have created and the changes they have made to operating system and application settings (such as display or usability customizations). In a software-only upgrade, the administrators typically provide an image of the upgrade software package or system and replace the existing software package or system on the users' existing workstations with the image.

To reduce a loss of productivity, some administrators may extract user state data before performing the hardware or software upgrade. In some practices, administrators may ask users to perform a backup operation by saving the user state data in another memory space that is not affected by the upgrade. Alternatively, the administrators may perform a migration operation to transfer the user state data for the users from previous workstations to the upgraded workstations. Both instances are cumbersome and time-consuming.

In the migration operation, the administrators currently employ a migration application tool that first asks administrators to identify the locations of files and/or registry keys in a data repository of the previous workstations where the user state data is stored. The administrators next provide these storage locations of the user state data as input to the migration tool by writing scripts to be processed by the migration tool. The migration tool next processes the scripts and gathers the contents of the specified files and registry keys.

Existing migration tools typically are able to gather customization or user state data by searching standard or known locations in the data repository (e.g., file system) of a workstation in a known execution environment (e.g., Microsoft® Windows®-based or Mac® OS-based). However, current migration tools falter in discovering the locations (e.g., whether in the registry data repository or other data repositories) other than the standard or known locations. Current migration tools also are unable to distinguish user state data from other information belonging to the applications. In addition, the migration tools also fail to facilitate codifying the user state data in executable scripts.

SUMMARY

Embodiments of the invention overcome the deficiencies of existing migration applications by providing administrators with a tool to automatically discover the storage locations of user state data associated with an application. Embodiments of the invention also automatically generate an executable migration script based on the discovered storage locations to migrate user state data.

Aspects of the invention also permit administrators to modify the discovered storage locations of user state data. Alternative embodiments of the invention discover user state data associated with the application installed in one or more execution environments and aggregate the discovered user state data across the execution environments.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

Figure 1:
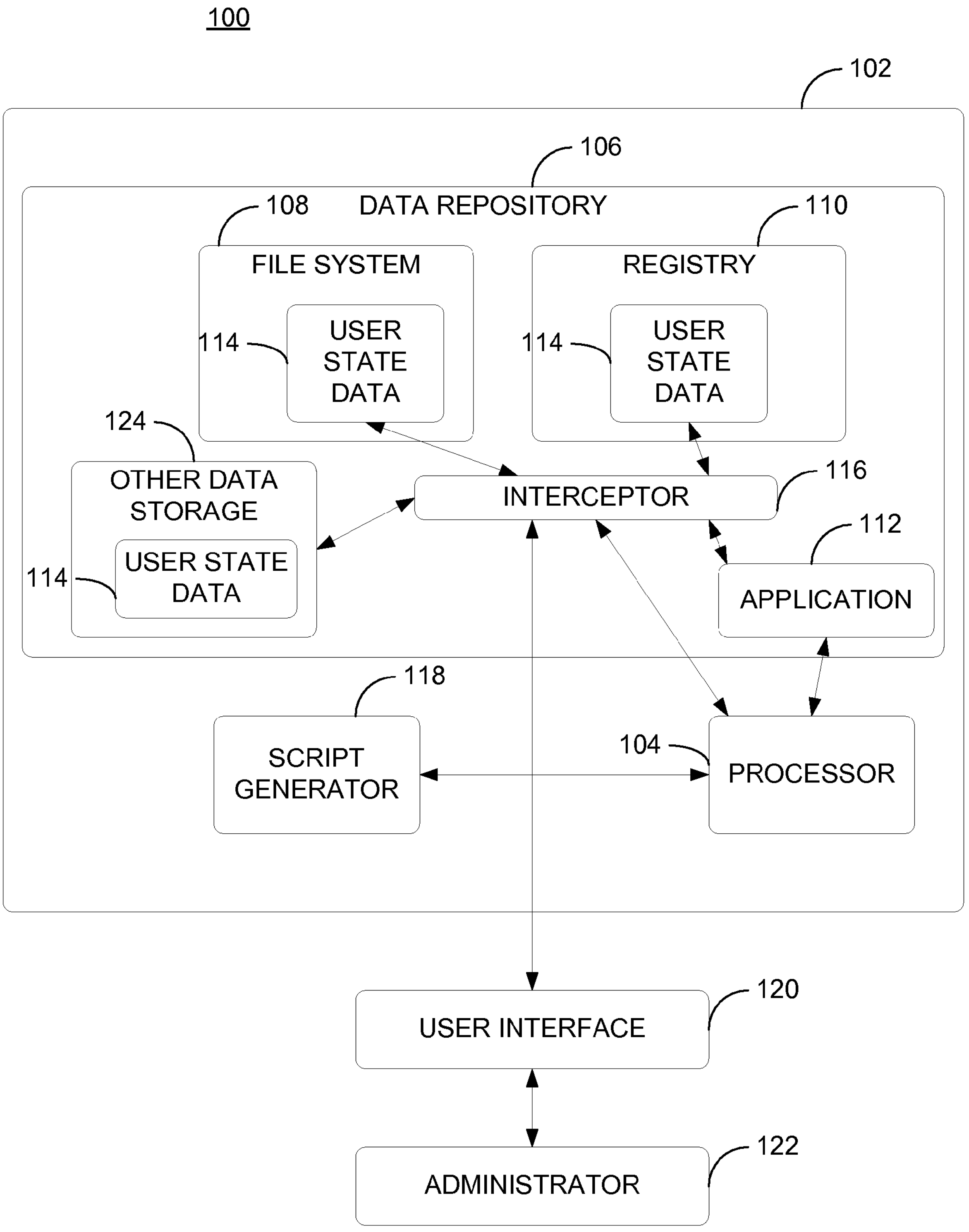
FIG. 1 is a block diagram illustrating a system for identifying locations of user state data associated with an application according to an embodiment of the invention.

Appendix A illustrates an exemplary script in XML format generated according to an embodiment of the invention.

Appendix B illustrates a portion of an exemplary implementation of executable codes that intercepts API interactions with application programs according to an embodiment of the invention.

Corresponding reference characters indicate corresponding parts throughout the drawings.

DETAILED DESCRIPTION

Referring first to FIG. 1, a block diagram illustrates a system 100 for identifying locations of user state data associated with an application according to an embodiment of the invention. The system 100 includes a general purpose computing device 102 which includes a processor 104 and a data repository 106. For example, the computing device 102 may be a personal computer (PC), a server computer, a pocket PC, a personal digital assistant (PDA), a cellular phone, a Smartphone, a portable media player, or other computing devices. The processor 104 may include a processing unit, a plurality of processing units, or a processing unit with various chip architecture design (e.g., single core, dual core, or other multi-core architecture). The data repository 106 generally includes a memory area such as a computer-readable medium. Those skilled in the art will recognize that the data repository 106 may include both volatile and nonvolatile media, removable and non-removable media, and may be any available medium accessible by the computing device 102 and implemented in any method or technology for storage of information such as computer readable instructions, data structures, program modules or other data.

In one example, the data repository 106 may be classified into a file system 108, a registry 110, and a data storage 124. The file system 108 typically includes common memory storage areas, such as folders, directories, and files that a user can access. For those skilled in the art, the file system 108 may include the part of the data repository 106 that is readily available to the user in saving data or file in the data repository 106 (e.g., C:\ drive, My computer, or "My documents" folder). The registry 110, which may also be a part of the data repository 106, includes configuration data and the like for applications and/or the operating system installed in the computing device 102. For example, the registry 110 includes a data store having parameter values, configuration settings, registry entries (e.g., registry keys), or the like. The data storage 124 may include data memory areas, such as an external memory area, a remote data storage area, or the like. The data store may describe and/or define how an application or operating system should be operated or executed.

The computing device 102 also includes one or more applications installed and stored in the data repository 106. For example, an application 112 is installed in the data repository 106 for performing one or more tasks. The application 112 may include computer-executable instructions, codes, routines or other computer-executable components for producing a technical outcome (e.g., assisting the user to compose a text document, an interactive/multimedia presentation, a musical composition, or the like). The application 112 typically includes user state data 114, such as customizations, configurations, or the like. For example, the user may configure the application 112 in the computing device 102 by setting a particular color for the font text, a particular width for the scroll bars, or the like. The user state data may include one or more of the following: (1) data associated with personal applications (e.g., user installed); (2) changes or modifications to the operating system; (3) changes or modifications to the application 112; (4) changes or configurations to toolbox or menus; (5) files or data saved to the computing device 102 by the user; (6) registry keys, and registry values accessed by the application; and (7) registry keys, and registry values associated with the application.

As mentioned previously, users may change the computing device 102 over time due to hardware or software upgrades. In the situation of a portable device such as a cellular phone or a PDA, the users may change the computing device 102 every one or two years when service providers offer discounted upgrades. In this situation, a user may wish to be able to transfer their address book entries (e.g., phone numbers), calendar events and appointments, alarm settings, photographs, ring-tones, and other data from their existing devices to the upgraded devices. Similarly, for general computers (e.g., workstations, desktops, laptops, tablet PCs, or the like), the users may wish to transfer customizations, settings, files, and other user state data from the old computer to the new computer. To properly account for all user state data 114 (e.g., changes, modifications, or personalization), embodiments of the invention facilitate the transfer or migration process by deploying an interceptor application 116 to record the locations of the user state data 114 that is associated with the application 112.

Still referring to FIG. 1, the interceptor application 116 may be an application programming interface (API) interceptor which "intercepts" or otherwise tracks interactions made by the application 112 to the data repository 106. By tracking the interactions, the interceptor 116 is able to record the locations of user state data, which includes files, registry keys, and registry values associated with and/or accessed by the application. In another embodiment, the interceptor 116 may track and record the locations of user state data stored on any data storage area (e.g., remote database, external data storage area, etc.) which is included by the interceptor 116. In one embodiment, the interceptor application 116 may be an API shim, which is a small executable library file that is adapted to convert one API into another. In yet another embodiment, the interceptor application 116 may be a dynamic link library (DLL) file which lacks a user interface and works in the background.

For example, suppose an administrator 122 wishes to gather the user state data 114 associated with the application 112. In one embodiment, the administrator 122 causes the interceptor application 116 to be launched before the application 112 is launched in the computing device 102. The interceptor application 116 monitors the interactions between the application 112 and the data repository 106. For example, the interactions may include function calls or requests to the file system 108, requests to the registry 110, etc. In another embodiment, the interceptor application 116 also records the types of calls or requests between the application 112 and the data repository 106. For example, the application 112 may wish to read data from the file system 108, while the application 112 may wish to write data to the registry 110 after the user configures the display options of the application 112.

The interceptor application 116 intercepts or records the interactions (e.g., function calls or requests to the file system 108 or the registry 110) and lists the recorded interactions. In one embodiment, the list of the recorded interactions is presented or provided to the administrator 122 visually or audibly via a user interface (UI) 120. For example, the administrator 122 may enter commands and information into computing device 102 through input devices or user interface selection devices such as a keyboard and a pointing device (e.g., a mouse, trackball, pen, or touch pad). Other input devices (not shown) may include a microphone, joystick, game pad, satellite dish, scanner, or the like. In one embodiment, these and other input devices are connected to processor 104 through the UI 120 that is coupled to a system bus or other known system bus architecture, but may be connected by other interface and bus structures, such as a parallel port, game port, or a Universal Serial Bus (USB). A monitor or other type of display device may also be connected to system bus via the UI 120, such as a video interface. In addition to the monitor, the computing device 102 often includes other peripheral output devices such as a printer and speakers, which may be connected through an output peripheral interface.

The administrator 122 may select all the user state data 114 by choosing all locations discovered and recorded by the interceptor application 116. Alternatively, the administrator 122 may also filter the recorded locations based on at least one of the following factors: type of access, location of the user state data (e.g., in the file system 108 or the registry 110), file size, or the like. Once the administrator 122 completes its selection, a script generator 118 generates computer-executable scripts based on the list. In one embodiment, the generated computer-executable scripts are computer-executable instructions or codes written in eXtensible Markup Language (XML). As such, embodiments of the invention eliminate the need to require the administrator 122 to personally identify the locations where the user state data 114 may be stored and accessed. The generated scripts may be executed on the computing device 102 or one of the execution environments 202 in FIG. 2. In another example, the generated script may be executed on any computer where the application is installed and on the computer on which the interception happened. Appendix A illustrates an exemplary generated script in XML format according to an embodiment of the invention.

Figure 2:
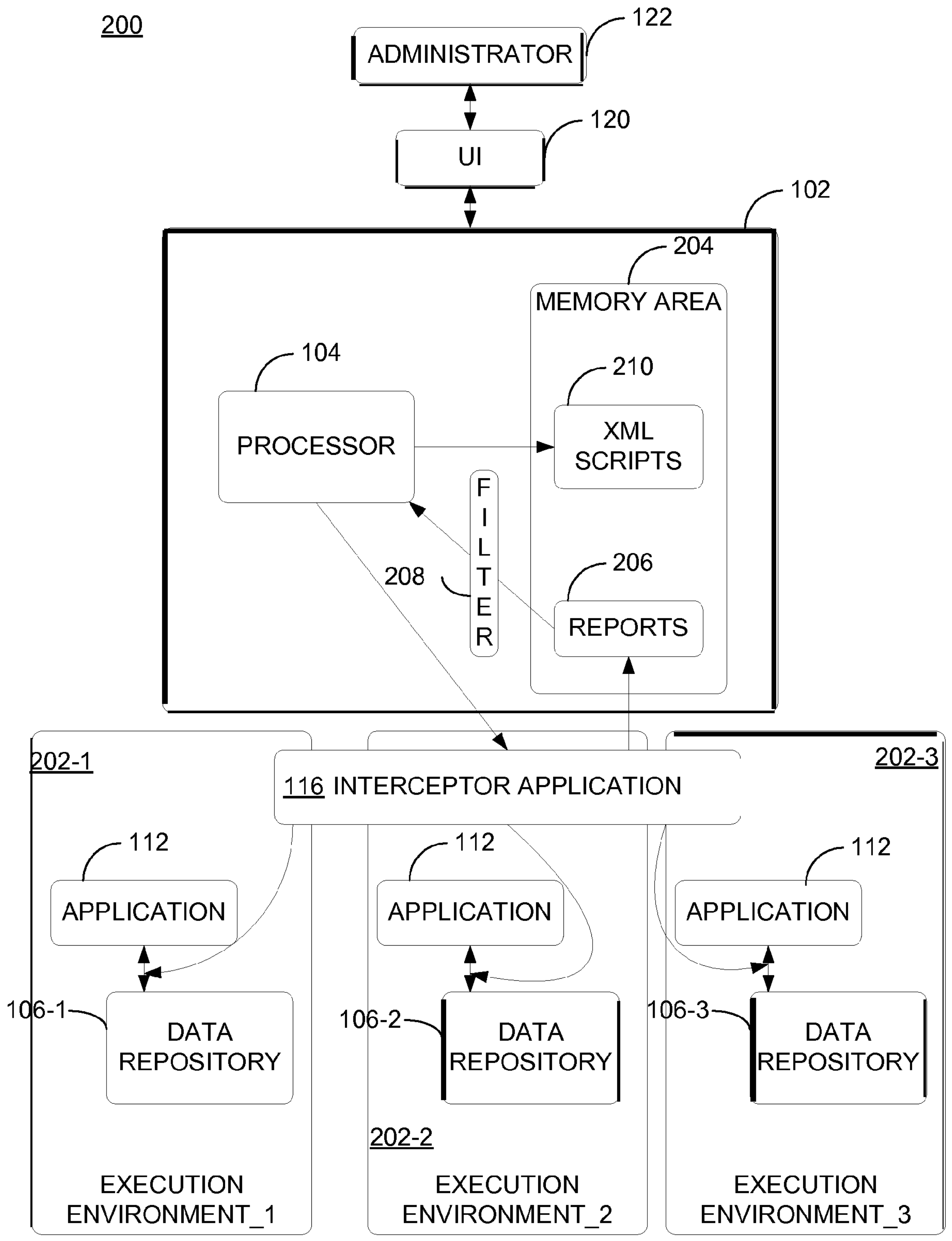
FIG. 2 is a block diagram illustrating aggregating user state data associated with an application installed in at least one execution environment according to an embodiment of the invention.

FIG. 2 illustrates an alternative embodiment of the invention showing a block diagram aggregating user state data associated with an application installed in at least one execution environment according to an embodiment of the invention. In this example, a system 200 includes the general computing device 102 deploying the interceptor application 116 to record interactions of the application 112 which is installed in one or more execution environments 202. In this alternative embodiment, the interceptor application 116 deployed to each of the execution environments 202 (e.g., 202-1, 202-2, and 202-3) intercepts the interactions between the application 112 and the corresponding data repository 106. The interceptor application 116 records the interactions and transmits a report 206 from the execution environments 202 to the computing device 102.

By deploying the interceptor application 116 across execution environments, such as workstations within an enterprise, embodiments of the invention further enhance the completeness in gathering where user state data 114 is stored in the data repository 106 for a given application (e.g., application 112). For example, the application 112 may store user state data in various locations as a function of the user's access rights, data repository configuration, etc. By aggregating the locations of user state data 114 associated with the application 112, embodiments of the invention increase the accuracy of collecting and discovering all user state data 114 associated with the application 112, as the application 112 may store the user state data in an obscure location in response to an event, (e.g., crashing, etc.). This approach increases the probability of gathering all the user state data 114 of the application 112 and may also be less time-consuming for the administrator 122. The script generator 118 may generate XML scripts 210 from the aggregated reports from the interceptor application 116. Appendix B illustrates a portion of an exemplary implementation of executable codes that intercepts API interactions with application programs according to an embodiment of the invention.

In an alternative embodiment, the administrator 122 may transfer from an execution environment (e.g., 202-1) to another execution environment (e.g., 202-2) the user state data 114 corresponding to the recorded locations discovered by the interceptor application 116. The administrator 122 implements the generated XML scripts 210 in the other execution environment 202-2 such that the user state data 114 in the execution environment 202-1 is transferred to the another execution environment 202-2.

In another embodiment, the interceptor application 116 is deployed over an extended or predetermined period time in the execution environments 202. At the end of the interception period, the interceptor application 116 gathers the lists of locations where user state data 114 of the application 112 are stored, from the different participating desktops or execution environments. The reports including the lists of locations are merged at the computing device 102, and the resultant list of user state data storage locations encompasses the changes made by all the users on all the participating execution environments over the entire interception period.

In another embodiment, the computing device 102 may operate in a networked environment using logical connections to one or more remote computers or computing devices, such as the execution environments 202. The execution environments 202 may be a personal computer, a server, a router, a network PC, a peer device or other common network node, and typically includes many or all of the elements described above relative to the computing device 202. The logical connections depicted in FIG. 2 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

When used in a local area networking environment, the computing device 102 is connected to the LAN through a network interface or adapter (not shown). When used in a wide area networking environment, the computing device 102 typically includes a modem (not shown) or other means for establishing communications over the WAN, such as the Internet. The modem, which may be internal or external, is connected to system bus via the UI, or other appropriate mechanism. In a networked environment, program modules depicted relative to the computing device 102, or portions thereof, may be stored in a remote memory storage device (not shown). The network connections shown are exemplary and other means of establishing a communications link between the computers may be used.

Generally, the processor 104 of the computing device 102 is programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

Figure 3A:
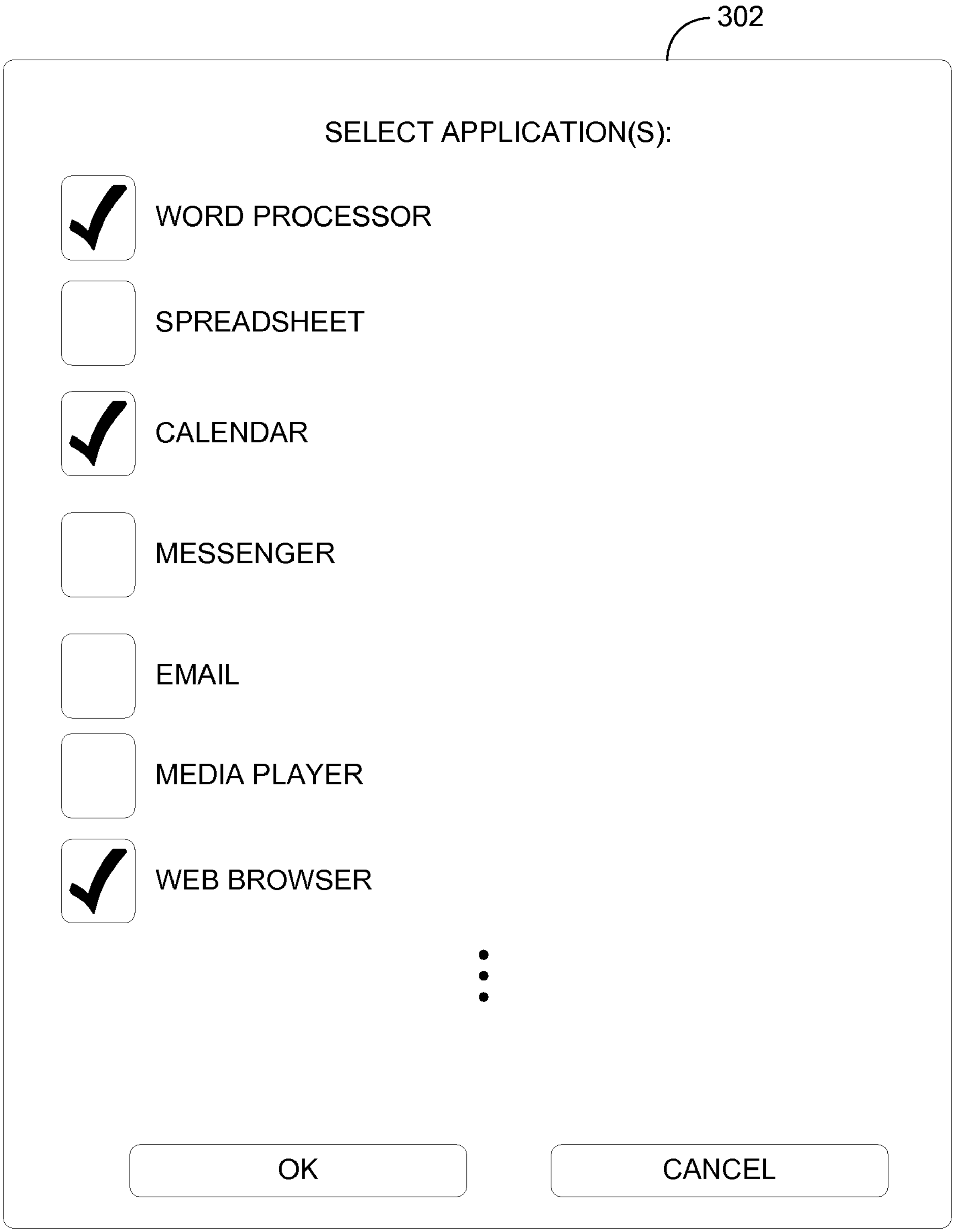
FIGS. 3A to 3B are exemplary user interface dialogs for selecting locations of user state data associated with an application installed in an execution environment according to an embodiment of the invention.
Figure 3B:
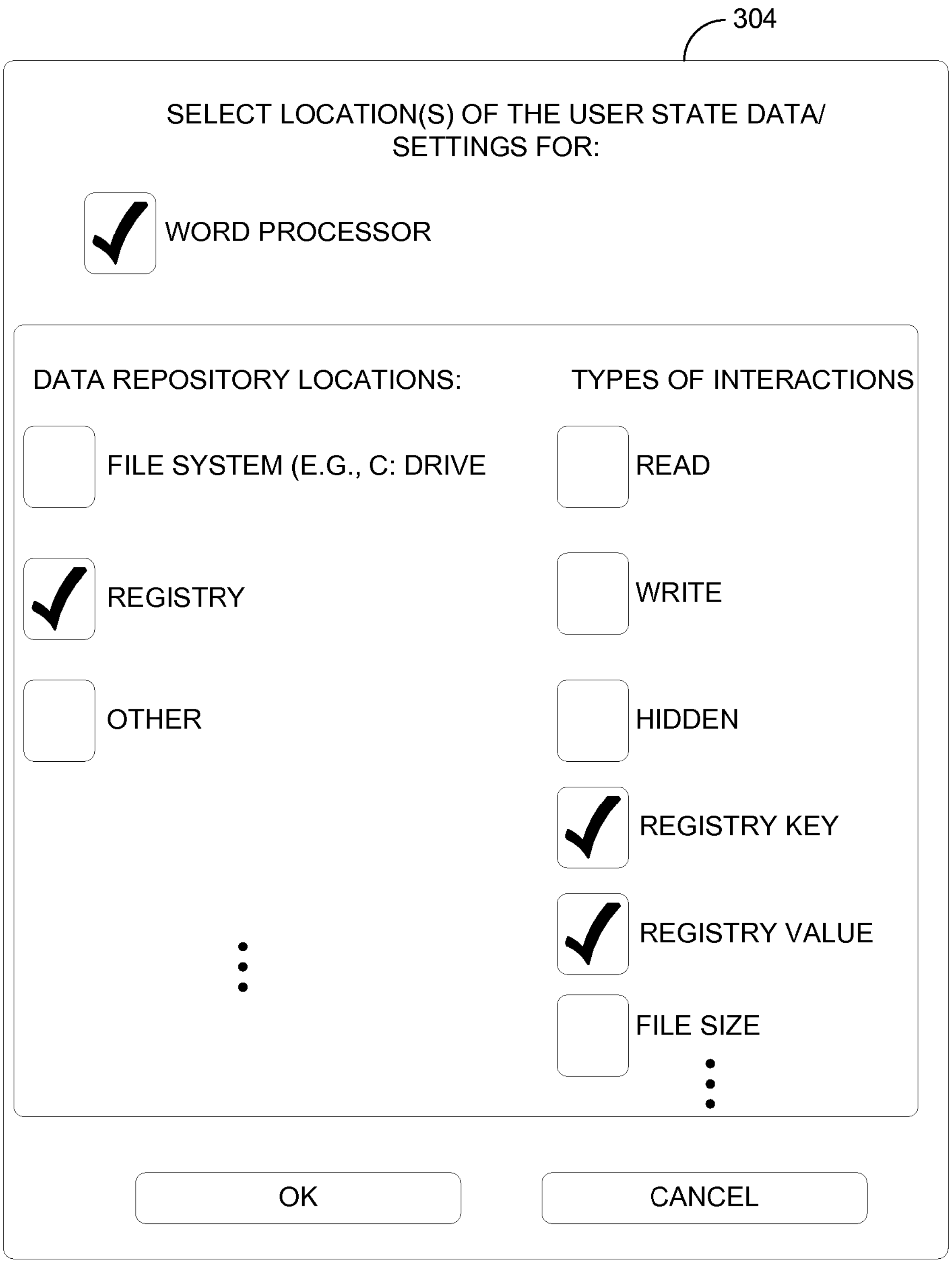

Referring now to FIGS. 3A and 3B, diagrams show exemplary user interface dialogs for selecting locations of user state data associated with an application installed in an execution environment according to an embodiment of the invention. FIG. 3A illustrates a dialog window 302 for selecting one or more applications that the administrator 122 wishes to monitor. In this illustration, the administrator 122 is asked to select one or more applications, such as a word processor application, a spreadsheet application, etc. In another embodiment, applications shown on the window 302 may be automatically selected if the administrator 122 has predefined the selection choices. FIG. 3B illustrates a filtering user interface dialog window 304 in which the administrator 122 may specify the locations where the user state data 114 is stored. For example, the administrator 122 may wish to limit the location or the type of interactions. As shown in FIG. 3B, the administrator 122 filters out the complete list by only selecting user state data location "Registry" and types "Registry Key" and "Registry Value." In an alternative embodiment, the administrator 122 may select all locations and types by default or filter the selection according to other criteria, such as file size. It is to be understood that other user interface representation of the selections shown in FIGS. 3A and 3B may be implemented without departing from the scope of the invention.

Figure 4:
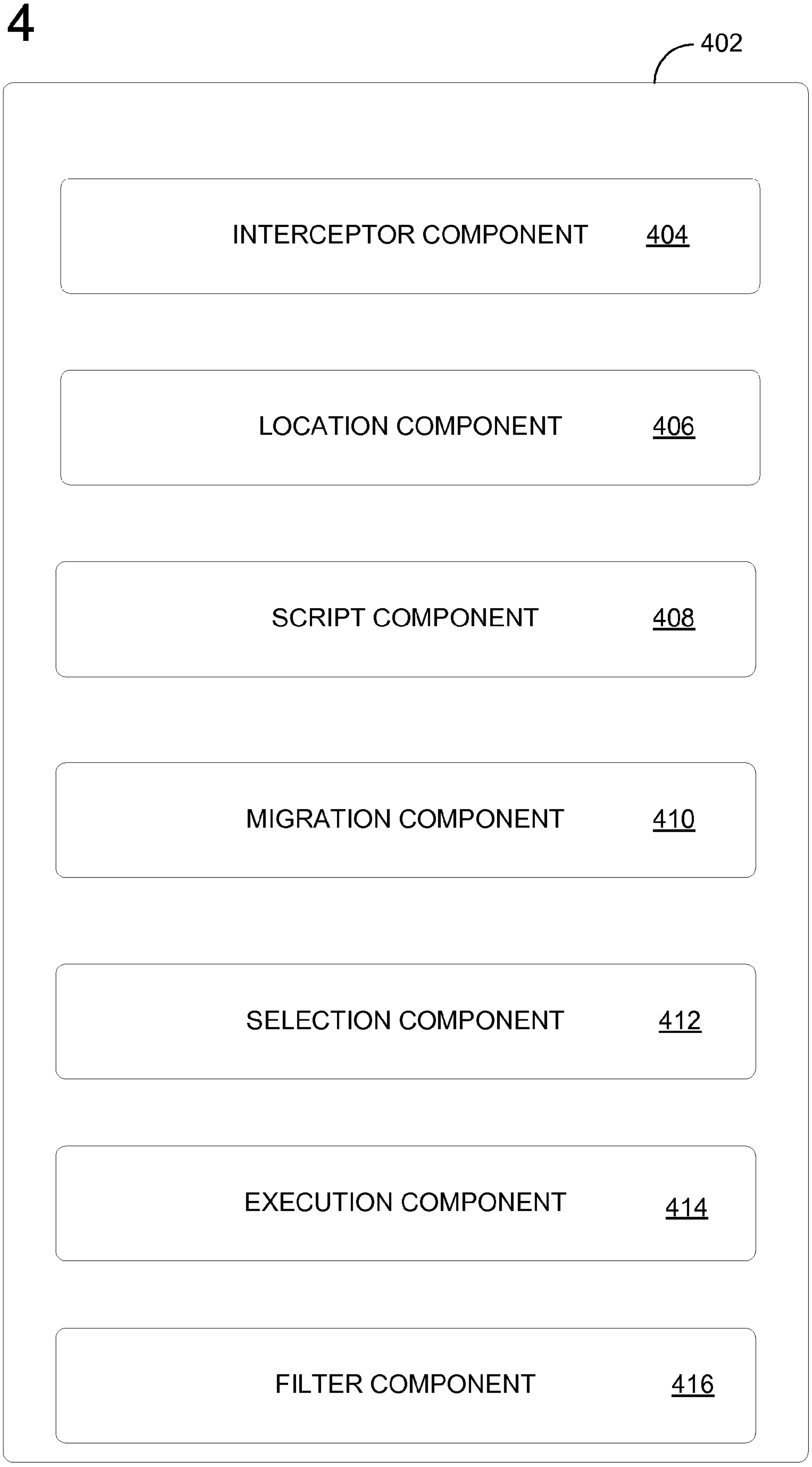
FIG. 4 is a block diagram illustrating an exemplary computer-readable medium on which aspects of the invention may be stored.
Figure 5:
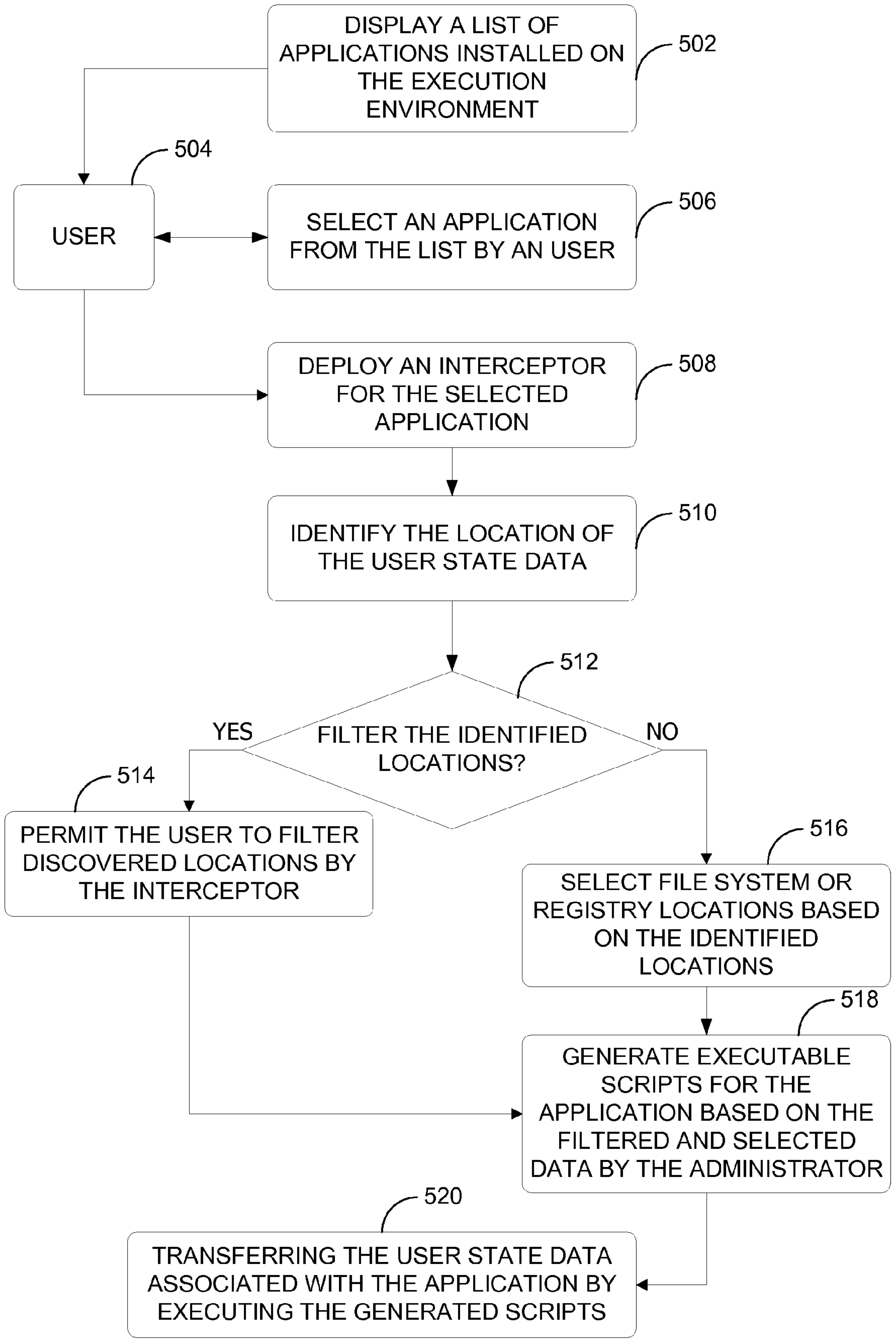
FIG. 5 is an exemplary flow chart illustrating operation of migrating user state data associated with an application according to an embodiment of the invention.

FIG. 4 is a block diagram illustrating an exemplary computer-readable medium 402 on which aspects of the invention may be stored. In one embodiment, computer-executable components stored on the computer-readable medium 402 executes operations illustrated in a flow chart in FIG. 5. Initially, a list of applications installed on an execution environment (e.g., computing device 102) is displayed to a user 504 (e.g., the administrator 122) at 502. The user 504 may select one or more applications from the displayed list at 506 using a selection component 412. The interceptor component 404 is launched in the computing device 102 or execution environments 202 at 508 and the interceptor component 404 records interactions between the application program and a data repository when the application program is executed in the execution environment. A location component 406 identifies locations in the data repository based on the recorded interactions between the application program and the data repository in the first execution environment at 510. The identified locations correspond to the user state data associated with the application program.

At 512, it is determined whether the identified locations are filtered based on various criteria (e.g., locations of the user state data or the types of interactions) using a filter component 416. If the identified locations are to be filtered, the user 504 is permitted to select the desirable locations from the identified locations at 514. If the determination is negative, the identified locations are selected at 516. A script component 408 generates computer-executable scripts based on the identified locations or selected locations at 518. In an alternative embodiment, a migration component 410 migrates or transfers the user state data associated with the application from a first execution environment to a second execution environment by executing the generated scripts in both the first (for gathering the user state data) and the second execution environment (for applying the user state data) at 520. In another example, when the migration component 410 migrates or transfers the user state data associated with the application from the first execution environment to one or more second execution environments, the migration component 410 executes the generated scripts in the first execution environment and then one or more second execution environments. In one embodiment, an execution component 414 executes the generated script in the second execution environment. For example, the execution component 414 may be a component adapted to executing executable code, such as the generated script.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computing device 102, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

```
   <?xml version="1.0" encoding="UTF-8" ?22
- <migration urlid="http://www.microsoft.com/migration/1.0/migxmlext/
MsnMessenger">
  <library prefix="MigSysHelper">MigSys.dll</library>
   - <!--
   MSN Messenger
   -->
- <component context="UserAndSystem" type="Application">
  <displayName _locID="migapp.msnmessenger">MSN Messenger</
  displayName>
  <environment name="GlobalEnv" />
  <environment name="GlobalEnvX64" />
- <environment>
- <variable name="MSNMessengerInstPath">
      <script>MigXmlHelper.GetStringContent("Registry",
      "%HklmWowSoftware%\Microsoft\MSNMessenger
      [InstallationDirectory]")</script>
     </variable>
     </environment>
- <role role="Settings">
- <detects>
- <detect>
      <condition>MigXmlHelper.DoesObjectExist("Registry","HKCU\
      Software\Microsoft\
      MSNMessenger")</condition>
     </detect>
- <detect>
      <condition>MigXmlHelper.DoesFileVersionMatch
      ("%MSNMessengerInstPath%\ms
      nmsgr.exe","ProductVersion","6.*")</condition>
      <condition>MigXmlHelper.DoesFileVersionMatch
      ("%MSNMessengerInstPath%\ms
      nmsgr.exe","ProductVersion","7.*")</condition>
     </detect>
     </detects>
- <rules context="User">
- <destinationCleanup>
- <objectSet>
  <pattern type="Registry">HKCU\Software\Microsoft\MSNMessenger
      [App Settings]</pattern>
```

APPENDIX A-continued

```
<pattern type="Registry">HKCU\Software\Microsoft\MSNMessenger
    [EnableIdleDetect]</pattern>
<pattern type="Registry">HKCU\Software\Microsoft\MSNMessenger
    [FtReceiveFolder]</pattern>
<pattern type="Registry">HKCU\Software\Microsoft\MSNMessenger
    [IM Color]</pattern>
<pattern type="Registry">HKCU\Software\Microsoft\MSNMessenger
    [IM Format]</pattern>
<pattern type="Registry">HKCU\Software\Microsoft\MSNMessenger
    [ShowEmoticons]</pattern>
<pattern type="Registry"22 HKCU\Software\Microsoft\MSNMessenger\
PhoneMRU\*
    [*]</pattern>
<pattern type="Registry">HKCU\Software\Microsoft\Windows\
CurrentVersion\Run
    [MSMSGS]</pattern>
    </objectSet>
    </destinationCleanup>
- <include>
- <objectSet>
<pattern type="Registry">HKCU\Software\Microsoft\MSNMessenger\
* [*]</pattern>
<pattern type="Registry">HKCU\Software\Microsoft\Windows\
CurrentVersion\Run
    [MSMSGS]</pattern>
<pattern type="File">% CSIDL_APPDATA%\Microsoft\MSN
Messenger\* [*]</pattern>
    </objectSet>
    </include>
- <exclude>
- <objectSet>
<pattern type="Registry">HKCU\Software\Microsoft\MSNMessenger
    [FtReceiveFolder]</pattern>
    </objectSet>
    </exclude>
- <merge script="MigXmlHelper.SourcePriority( )">
- <objectSet>
<pattern type="File">% CSIDL_APPDATA%\Microsoft\MSN
Messenger\* [*]</pattern>
    </objectSet>
    </merge>
    </rules>
- <rules context="System">
- <destinationCleanup>
- <objectSet>
<pattern
    type="Registry">%HklmWowSoftware%\Microsoft\Windows\
    CurrentVersion\Run
    [MSMSGS]</pattern>
    </objectSet>
    </destinationCleanup>
- <include>
- <objectSet>
<pattern
    type="Registry">%HklmWowSoftware%\Microsoft\Windows\
    CurrentVersion\Run
    [MSMSGS]</pattern>
    </objectSet>
    </include>
    </rules>
    </role>
    </component>
    </migration>
```

APPENDIX B

```
void Log(ResourceType rt, AccessType at, LPCWSTR fullPath)
{
  static LONG logCount = 0;
  if (at == AccessTypeNone)
    return;
#ifdef SHIM_WRITES_ONLY
  if ((at & AccessTypeWrite) == 0)
    return;
#endif
      // In this prototype, we use optimistic locking for performance
```

APPENDIX B-continued

```
      reasons.
  if ((logCount % LogLinesPerFile) == 0)
  {
    LONG initialValue = InterlockedCompareExchange(&logCount,
logCount + 1, logCount);
    if ((initialValue % LogLinesPerFile) == 0)
    {
      // Create a log file every LogLinesPerFile messages.
      CreateLogFile( );
    }
    else
    {
      // There is a chance that this thread writes using the file handle that
      // has been closed. We can live with this loss of log message.
    }
  }
  else
  {
    // Note, we may be off by 1 due to simultaneous increments by
    // multiple threads, but we don't care as this is only approximate.
    ++logCount;
  }
  FILE *logFile = g_logFile;
  if (logFile == NULL)
    return;
      // We may not be able to prevent multi-threaded calls, at least
      // prevent recursive writes.
      g_writingLog = true;
fwprintf(logFile, L"%s %s%s %s\n",
  ResourceTypeStrings[rt],
  (at & AccessTypeRead) != 0 ? AccessTypeReadString: L" ",
  (at & AccessTypeWrite) != 0 ? AccessTypeWriteString: L" ",
  fullPath != NULL ? fullPath : L"");
        g_writingLog = false;
}
void LogRegistryAccess(bool isRegistryKey, AccessType at, LPCWSTR
fullPath)
{
        Log(isRegistryKey ? ResourceTypeRegistryKey :
ResourceTypeRegistryValue, at, fullPath);
}
typedef NTSYSCALLAPI
NTSTATUS
(NTAPI
*_pfn_NtCreateKey)(
  __out PHANDLE KeyHandle,
  __in ACCESS_MASK DesiredAccess,
  __in POBJECT_ATTRIBUTES ObjectAttributes,
  __reserved ULONG TitleIndex,
  __in_opt PUNICODE_STRING Class,
  __in ULONG CreateOptions,
  __out_opt PULONG Disposition
  );
NTSTATUS APIHOOK(NtCreateKey)(
  __out PHANDLE KeyHandle,
  __in ACCESS_MASK DesiredAccess,
  __in POBJECT_ATTRIBUTES ObjectAttributes,
  __reserved ULONG TitleIndex,
  __in_opt PUNICODE_STRING Class,
  __in ULONG CreateOptions,
  __out_opt PULONG Disposition
  )
{
  NTSTATUS status;
  CSTRING_TRY
  {
        ULONG disp;
                status = ORIGINAL API(NtCreateKey)(KeyHandle,
DesiredAccess | KEY_QUERY_VALUE, ObjectAttributes, TitleIndex,
Class, CreateOptions, &disp);
                if (Disposition != NULL)
                        *Disposition = disp;
      while(NT_SUCCESS(status))
      {
#ifndef SHIM_WRITES_ONLY
        // If we are logging writes only, don't log key opens.
        if(disp != REG_CREATED_NEW_KEY)
                              break;
#endif
```

APPENDIX B-continued

```
        CString fullKeyName;
        GetFullKeyName(ObjectAttributes->RootDirectory,
ObjectAttributes->ObjectName, fullKeyName);
        AccessType at = AccessTypewrite;
        if ((DesiredAccess & (KEY_EXECUTE | KEY_READ)) != 0)
        {
          at =(AccessType) (at AccessTypeRead);
        }
        LogRegistryAccess(true, at, fullKeyName);
                        break;
      }
  }
  CSTRING_CATCH
  {
  }
  return status;
}
```

What is claimed is:

1. One or more computer-readable media having computer-executable components for migrating user state data from a first execution environment to a second execution environment, said user state data being associated with an application program, said computer-executable components comprising:

before migration, an interceptor component for recording interactions between the application program to be migrated and a data repository in the first execution environment when the application program is executed in the first execution environment, wherein the interceptor component is launched before the application program is launched in the first execution environment, said interactions including at least one of the following: function calls to the data repository and requests to the data repository;

a location component for identifying specific locations in the data repository based on the recorded interactions between the application program and the data repository in the first execution environment, said identified locations corresponding to the user state data associated with the application program;

a script component for generating computer-executable scripts based on the identified locations; and a migration component for migrating the user state data associated with the application program from the first execution environment to the second execution environment by executing the generated computer-executable scripts in the first execution environment and the second execution environment.

2. The computer-readable media of claim 1, wherein the interceptor component is configured to record one or more of the following interactions between the application program and the data repository: function calls to locations in the data repository in each of the plurality of execution environments, types of function calls, and types of access to files, registry keys, or registry values in the data repository.

3. The computer-readable media of claim 1, farther comprising:

a selection component for selecting the application program to be executed in the first execution environment; and an execution component for executing the selected application program in the first execution environment, said application program interacting with a data repository in the first execution environment for the execution of the application program.

4. The computer-readable media of claim 1, wherein the data repository includes at least one or more of the following: a registry data store and a file system of the first execution environment.

5. The computer-readable media of claim 1, wherein the interceptor component comprises an application programming interface (API) shim.

6. The computer-readable media of claim 1, farther comprising a filter component for filtering the identified locations, and wherein the script component comprises generating computer-executable scripts based on the filtered locations.

7. The computer-readable media of claim 1, wherein the script component is farther configured to receive user input for modifying the generated computer-executable scripts, and wherein the migration component comprises migrating the user state data associated with the application program from the first execution environment to the second execution environment by executing the modified computer-executable scripts in the first and second execution environment.

8. A system for preserving settings associated with a target application program, said system comprising:

a plurality of execution environments for executing the target application program, each of said plurality of execution environment having a data repository for storing settings associated with the target application program;

a processor configured to execute computer-executable instructions for:

before migration, deploying an interceptor application to at least one of the plurality of execution environments for recording interactions between the target application program to be migrated and the data repository of the respective execution environment, wherein the processor launches the interceptor application before the processor launches the target application program in the respective execution environment, said interactions including at least one of the following: function calls to the data repository and requests to the data repository;

receiving a report from the deployed interceptor application, said report including entries describing recorded interactions between the target application program and the data repository for each of the execution environments;

aggregating the received reports;

generating scripts based on the aggregated reports for preserving the settings associated with the target application program being executed by the plurality of execution environments; and a memory area for storing the received reports, the aggregated reports, and the generated XML scripts for migrating the settings associated with the target application program.

9. The system of claim 8, wherein the data repository for each of the plurality of execution environments includes at least one or more of the following: a registry data store and a file system of the each of the plurality of execution environments.

10. The system of claim 8, wherein the interceptor application is configured to record one or more of the following interactions between the target application program and the at least one of the plurality of execution environments: function calls to locations in the data repository in each of the plurality of execution environments, types of function calls, and types of access to files, registry keys, or registry values in the data repository.

11. The system of claim 8, wherein the processor is further configured to filter the aggregated reports based on at least one or more of the following: locations in the data repository in each of the plurality of execution environments, the types of function calls, file size, and the types of access in the data repository, and wherein the processor is configured to generates scripts based on the filtered reports for preserving the settings associated with the target application program being executed by the plurality of execution environments.

12. The system of claim 11, further comprising a user interface (UT) for receiving input from an administrator, and wherein the processor is configured to filter the aggregated reports in response to the input through the UT.

13. The system of claim 8, wherein the processor is further configured to terminate the interceptor application after a predetermined time period, said processor receiving the reports from the interceptor application before the processor terminates the interceptor application.

14. The system of claim 8, wherein the interceptor application comprises an application programming interface (API) shim.

15. A method for migrating user state data associated with one or more application programs from a first execution environment to a second execution environment, said first execution environment having the one or more application programs executed therein, said method comprising:

initializing a migration process by executing an interceptor application for recording interactions between an application program to be migrated and a data repository in the first execution environment, wherein the interceptor application is launched before the application program is launched in the first execution environment, said interactions including at least one of the following: function calls to the data repository and requests to the data repository;

executing the application program in the first execution environment, said application program interacting with the data repository in the first execution environment for the execution of the application program;

identifying, independent of user interaction, at least one specific location in the data repository based on the recorded interactions between the application program and the data repository in the first execution environment, said at least one identified location corresponding to user state data for the application program;

generating computer-executable scripts based on the at least one identified location; and transferring the user state data associated with the application program based on the generated computer-executable scripts for from the first execution environment in which the application is installed to the second execution environment by executing the generated computer-executable scripts in both the first execution environment and second execution environment.

16. The method of claim 15, farther comprising receiving input from an administrator for selecting a particular application program to be executed in the first execution environment, and wherein executing comprises executing the selected application program in the first execution environment.

17. The method of claim 15, wherein recording comprises recording interactions of at least one or more of the following: function calls to locations in the data repository in each of the plurality of execution environments, types of function calls, and types of access to files, registry keys, file size, or registry values in the data repository.

18. The method of claim 15, further comprising one or more of the following:

filtering at least based on one of the following: the identified location entries, and wherein generating comprising generating computer-executable scripts based on the filtered location entries, and executing the particular application program in a plurality of execution environments, wherein each of the plurality of execution environments includes a data repository, and wherein recording comprises recording interactions between the particular application program and the data repository in each of the plurality of execution environments.

19. The method of claim 18, further comprising receiving the recorded interactions between the particular application program and the data repository in each of the plurality of execution environments, and farther comprising aggregating the received interactions for analysis to transfer user state data associated with the particular application program in the plurality of execution environments.

20. The method of claim 15, wherein one or more computer-readable media have computer-executable instructions for performing the method of claim 15.

* * * * *

UNITED STATES PATENT AND TRADEMARK OFFICE

CERTIFICATE OF CORRECTION

PATENT NO. : 7,523,122 B2
APPLICATION NO. : 11/534930
DATED : April 21, 2009
INVENTOR(S) : Vijayendra G. Vasu It is certified that error appears in the above-identified patent and that said Letters Patent is hereby corrected as shown below:

In column 11, line 58, in Claim 3, delete "farther" and insert -- further --, therefor.

In column 12, line 8, in Claim 6, delete "farther" and insert -- further --, therefor.

In column 12, line 13, in Claim 7, delete "farther" and insert -- further --, therefor.

In column 13, line 11, in Claim 12, delete "(UT)" and insert -- (UI) --, therefor.

In column 13, line 13, in Claim 12, delete "UT." and insert -- UI. --, therefor.

In column 14, line 10, in Claim 16, delete "farther" and insert -- further --, therefor.

In column 14, line 38, in Claim 19, delete "farther" and insert -- further --, therefor.

Signed and Sealed this
Third Day of May, 2011

David J. Kappos
*Director of the United States Patent and Trademark Office*